United States Patent
Zhou et al.

(10) Patent No.: US 11,155,275 B2
(45) Date of Patent: Oct. 26, 2021

(54) ROPE CLIMBING ROBOT CAPABLE OF SURMOUNTING OBSTACLE AND OBSTACLE SURMOUNTING METHOD THEREOF

(71) Applicant: China University of Mining and Technology, Jiangsu (CN)

(72) Inventors: Gongbo Zhou, Jiangsu (CN); Hongwei Tang, Jiangsu (CN); Chaoquan Tang, Jiangsu (CN); Zhencai Zhu, Jiangsu (CN); Zhenzhi He, Jiangsu (CN); Wei Li, Jiangsu (CN); Fan Jiang, Jiangsu (CN)

(73) Assignee: China University of Mining and Technology, Jiangsu (CN)

( * ) Notice: Subject to any disclaimer, the term of this patent is extended or adjusted under 35 U.S.C. 154(b) by 0 days.

(21) Appl. No.: 17/043,704

(22) PCT Filed: Nov. 11, 2019

(86) PCT No.: PCT/CN2019/117031
§ 371 (c)(1),
(2) Date: Sep. 30, 2020

(87) PCT Pub. No.: WO2021/056718
PCT Pub. Date: Apr. 1, 2021

(65) Prior Publication Data
US 2021/0276599 A1    Sep. 9, 2021

(30) Foreign Application Priority Data

Sep. 23, 2019  (CN) .......................... 201910901752.8

(51) Int. Cl.
*B61B 7/06*    (2006.01)
*B25J 5/02*    (2006.01)
*B61L 27/04*   (2006.01)

(52) U.S. Cl.
CPC .................. *B61B 7/06* (2013.01); *B25J 5/02* (2013.01); *B61L 27/04* (2013.01)

(58) Field of Classification Search
CPC ............... B61B 7/06; B25J 5/02; B61L 27/04
See application file for complete search history.

(56) References Cited

U.S. PATENT DOCUMENTS

| 4,695,027 A * | 9/1987 | Lindholm | B25J 9/0084 |
| | | | 248/123.2 |
| 9,248,875 B2 * | 2/2016 | Wolf | B62D 57/024 |
| 10,889,340 B2 * | 1/2021 | Nichol | B62D 55/065 |

FOREIGN PATENT DOCUMENTS

| CN | 105000078 | 10/2015 |
| CN | 105035200 | 11/2015 |

(Continued)

OTHER PUBLICATIONS

"International Search Report (Form PCT/ISA/210)" of PCT/CN2019/117031, dated Jun. 28, 2020, pp. 1-5.

(Continued)

*Primary Examiner* — Jason C Smith
(74) *Attorney, Agent, or Firm* — JCIPRNET

(57) ABSTRACT

Disclosed in the present invention are a rope climbing robot capable of surmounting an obstacle and an obstacle surmounting method thereof. The rope climbing robot includes a robot body. The robot body includes a shell, a drive module and a guide module. The shell is longitudinally cut into an even number of shell segments, and is laterally cut into a corresponding drive housing segment and a corresponding guide housing segment according to mounting positions of the drive module and the guide module in the shell. There is at least one guide module and at least one guide housing segment, and a shell opening mechanism is further mounted in the shell. The shell opening mechanism includes a first shell opening mechanism configured to open/close the guide (Continued)

housing segment and a second shell opening mechanism configured to open/close the drive housing segment.

10 Claims, 4 Drawing Sheets

(56) References Cited

FOREIGN PATENT DOCUMENTS

| | | |
|---|---|---|
| CN | 108528557 | 9/2018 |
| CN | 109969279 | 7/2019 |
| GB | 2531893 | 5/2016 |

OTHER PUBLICATIONS

"Written Opinion of the International Searching Authority (Form PCT/ISA/237)" of PCT/CN2019/117031, dated Jun. 28, 2020, pp. 1-3.

* cited by examiner

ROPE CLIMBING ROBOT CAPABLE OF SURMOUNTING OBSTACLE AND OBSTACLE SURMOUNTING METHOD THEREOF

CROSS-REFERENCE TO RELATED APPLICATION

This application is a 371 of international application of PCT application serial no. PCT/CN2019/117031, filed on Nov. 11, 2019, which claims the priority benefit of China application no. 201910901752.8, filed on Sep. 23, 2019. The entirety of each of the above mentioned patent applications is hereby incorporated by reference herein and made a part of this specification.

BACKGROUND

Technical Field

The present invention relates to the field of robot technologies, and in particular, to a rope climbing robot capable of surmounting an obstacle and an obstacle surmounting method thereof.

Description of Related Art

Robots can not only complete monotonous and tedious tasks in daily life and make human life easier, but also can replace people into places beyond human reach such as narrow and deep environments, oxygen-free environments, high temperature environments, and extremely cold environments, to complete tasks that humans cannot do. Therefore, a steel wire rope in a narrow and deep environment is used as a carrier, and multiple rope climbing robots are arranged on the steel wire rope to form a wireless sensor monitoring network to complete monitoring and maintenance of a surface of the steel wire rope and the surrounding environment. However, when the robot on the wire rope fails to move, the original wireless sensor monitoring network is destroyed. Although the wireless sensor monitoring network can be repaired by adjusting other robots that are functioning properly, it is not very repairable and can complicate the entire control system. If multiple rope climbing robots in a particular inspection area are damaged, the entire wireless sensor monitoring network is caused to break down, which may pose a serious threat to enterprise production and staff.

SUMMARY

In view of the disadvantage of the prior art, the present invention provides a rope climbing robot capable of overturning. The rope climbing robot can move freely and surmount a faulty robot that cannot move due to a fault, so that autonomous arrangement and repair of a wireless sensor monitoring network are realized, and a resident node is disposed for all-weather monitoring of detected minor damage and a location at which the damage has occurred.

To achieve the foregoing technical objectives, the following technical solutions are to be adopted in the present invention. A rope climbing robot capable of overturning is provided and includes a robot body. The robot body is capable of climbing along a guide member, and includes a shell, a drive module and a guide module. Middle positions at two ends of the shell are provided with through holes in communication with each other for the guide member to pass through. The drive module and the guide module are separately mounted in the shell along an extending direction of the guide member. The shell is longitudinally cut into an even number of shell segments, and is laterally cut into a corresponding drive housing segment and a corresponding guide housing segment according to mounting positions of the drive module and the guide module in the shell. There is at least one guide module and at least one guide housing segment, and a shell opening mechanism is further mounted in the shell. The shell opening mechanism includes a first shell opening mechanism configured to open/close the guide housing segment and a second shell opening mechanism configured to open/close the drive housing segment. Each shell segment corresponding to each guide housing segment is equipped with one first shell opening mechanism. Cooperation of the first shell opening mechanisms can open/close the shell segment corresponding to the guide housing segment in the shell. Each first shell opening mechanism includes a shell opening mounting platform and a memory alloy torsion spring. The memory alloy torsion spring is mounted on the shell opening mounting platform. The shell opening mounting platform has a torsion arm at one end fixed to the shell opening mounting platform, and a torsion arm at the other end fixed to one of the shell segments corresponding to the guide housing segment. The second shell opening mechanism can open/close two shell segments disposed at 180° corresponding to the drive housing segment in the shell, and includes scissor rods and an adjustment mechanism that synchronously pushes the scissor rods to move in the same direction to realize opening/closing of the scissor rods. The adjustment mechanism includes two linear drive mechanisms, and fixed parts of the two linear drive mechanisms are respectively mounted in the shell segments disposed at 180°. Both ends of each of two rods in the scissor rod are connected between the fixed part of one of the two linear drive mechanisms and a power drive end of the other linear drive mechanism. The shell opening mounting platform is fixed to the fixed part of the linear drive mechanism of the second shell opening mechanism.

Further, there are two guide modules: a first guide module and a second guide module, which are separately disposed on two sides of the drive module along a length extension direction of the guide member. The shell is laterally cut into three segments including a first housing segment, a second housing segment and a third housing segment in sequence. Both the first housing segment and the third housing segment are the guide housing segments, the first guide module is mounted in the first housing segment, and the second guide module is mounted in the third housing segment. The second housing segment is the drive housing segment.

Further, the shell is longitudinally cut into four shell segments: a first shell segment, a second shell segment, a third shell segment and a fourth shell segment.

Further, the linear drive mechanism is a screw mechanism, including a stepper motor, a spiral screw connected to a power output end of the stepper motor, and a screw nut in threaded fitting connection with the spiral screw. The spiral screw of each screw mechanism is correspondingly fixed in each shell segment corresponding to the second housing segment along a length extension direction of the shell. The shell opening mounting platform is fixed to the spiral screw by a bolt.

Further, the first shell opening mechanism further includes a double-ended stud, a spring washer and a nut. The double-ended stud is fixed to the shell opening mounting platform by the nut fitted at both ends. The memory alloy torsion spring is sleeved on a periphery of the double-ended stud. The double-ended stud is fitted with the spring washer on an outer side of each of both ends or one end of the memory alloy torsion spring.

Further, the drive module is disposed in the shell and includes four small drive modules: a first small drive module, a second small drive module, a third small drive module and a fourth small drive module. The first small drive module, the second small drive module, the third small drive module, and the fourth small drive module are disposed in the shell in two layers. The first small drive module and the third small drive module constitute an upper drive of the drive module and are distributed at 180° on the same ring surface at a splicing position of the first housing segment and the second housing segment. The second small drive module and the fourth small drive module constitute a lower drive of the drive module and are distributed at 180° on the same ring surface at a splicing position of the second housing segment and the third housing segment.

Further, each small drive module includes a drive mechanism platform, a direct current brushless motor, a reducer, a first-stage bevel gear reducer, a drive shaft and a magnetic wheel. The direct current brushless motor, the reducer, the first-stage bevel gear reducer, and the drive shaft are separately mounted on the drive mechanism platform. A power output end of the direct current brushless motor is connected to the magnetic wheel after sequentially passing through the reducer, the first-stage bevel gear reducer and the drive shaft.

Further, the guide modules each include four small guide modules, and the small guide modules are arranged corresponding to the four shell segments of the shell. Each small guide module includes a guide mechanism support, a guide mechanism tension spring and a guide wheel. The guide wheel is positioned and supported by the guide mechanism support, and the guide mechanism support is fixed to the shell by the guide mechanism tension spring. The guide mechanism tension spring is made of a memory alloy material.

Further, both the first housing segment and the third housing segment are truncated cone-shaped, and the second housing segment is cylindrical. The shell is formed into an olive-like structure with a thick middle part and two tapered ends through sequential splicing of the first housing segment, the second housing segment and the third housing segment.

Another technical objective of the present invention is to provide an obstacle surmounting method based on the rope climbing robot capable of overturning described above. When the robot body senses presence of a faulty robot ahead, the drive module, the guide module, and the shell opening mechanism are controlled to cause the robot body to surmount the faulty robot. The method specifically includes the following steps:

(1) if the robot body senses the presence of the faulty robot ahead, the stepper motor is rotated to release a pre-tightened state;

(2) the direct current brushless motor rotates to drive the magnetic wheel to rotate, where an infrared sensor works to detect whether there is the faulty robot ahead;

(3) after the infrared sensor detects the faulty robot, the direct current brushless motor of the drive module is stopped and the memory alloy torsion spring is heated;

(4) after the heating of the memory alloy torsion spring is completed, the direct current brushless motor and the stepper motor co-rotates to surmount the third housing segment of the faulty robot; and after the third housing segment is surmounted, the stepper motor stops rotating;

(5) when the magnetic wheel reaches the first housing segment of the faulty robot, the stepper motor of the robot body rotates to retract the scissor rods;

(6) after the robot body completely surmounts the faulty robot, the stepper motor stops rotating and the direct current brushless motor continues to rotate; and (7) if it is determined that the robot reaches a specified position, the direct current brushless motor stops rotating and the stepper motor rotates to pre-tighten the spiral screw.

According to the foregoing technical solutions, the present invention has the following advantages over the prior art.

1. In the present invention, the shell of the robot body is first longitudinally cut into blocks, and a specific opening mechanism is used to implement the opening/closing of the robot body to prepare for the robot body to surmount an obstacle. In addition, the robot body is laterally cut into segments (where the guide housing segment and the drive housing segment are disposed based on segments), so that the obstacle surmounting can be realized. Therefore, the robot of the present invention can not only surmount small obstacles on a steel wire rope, but also surmount itself. When a wireless monitoring network is formed, it has a strong capability for autonomous network troubleshooting.

2. The robot can move along the steel wire rope or in an axial direction of the rod, and its load is greater.

3. The drive mechanism of the robot is four independently powered magnetic wheels. The magnetic wheel structure provides higher inspection efficiency compared with creeping and crawler movement methods. The wheels of the robot are magnetic, which can provide sufficient attraction force, and can provide greater friction and better robot performance compared with other structures such as spring tensioning.

DESCRIPTION OF THE EMBODIMENTS

Figure 1:
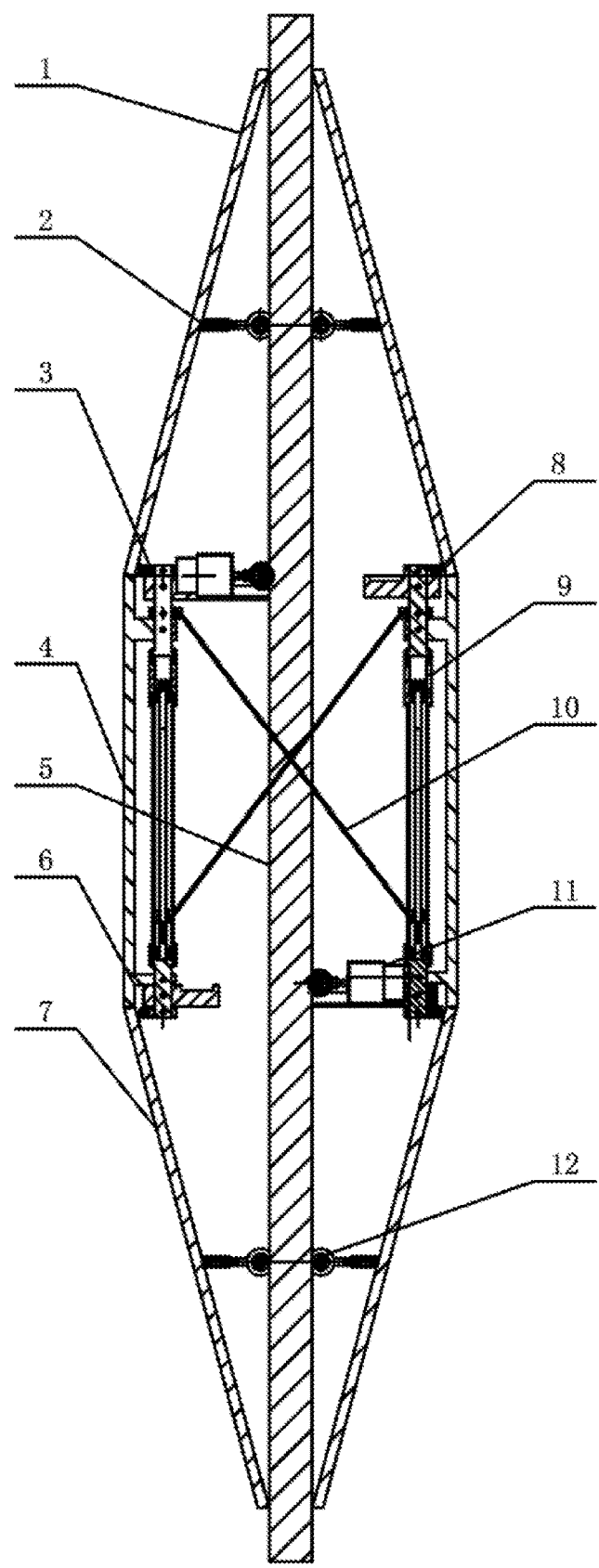
FIG. 1 is a cross-sectional view of a rope climbing robot capable of surmounting an obstacle according to the present invention.
Figure 2:
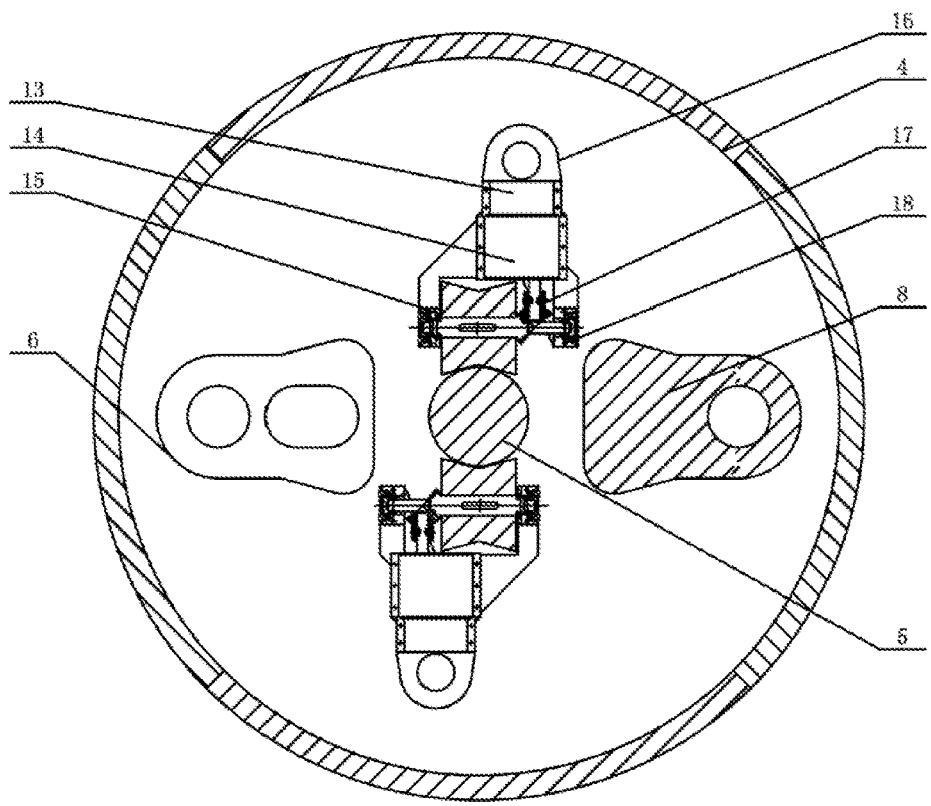
FIG. 2 is a cross-sectional view of a drive module of a rope climbing robot capable of surmounting an obstacle according to the present invention.
Figure 3:
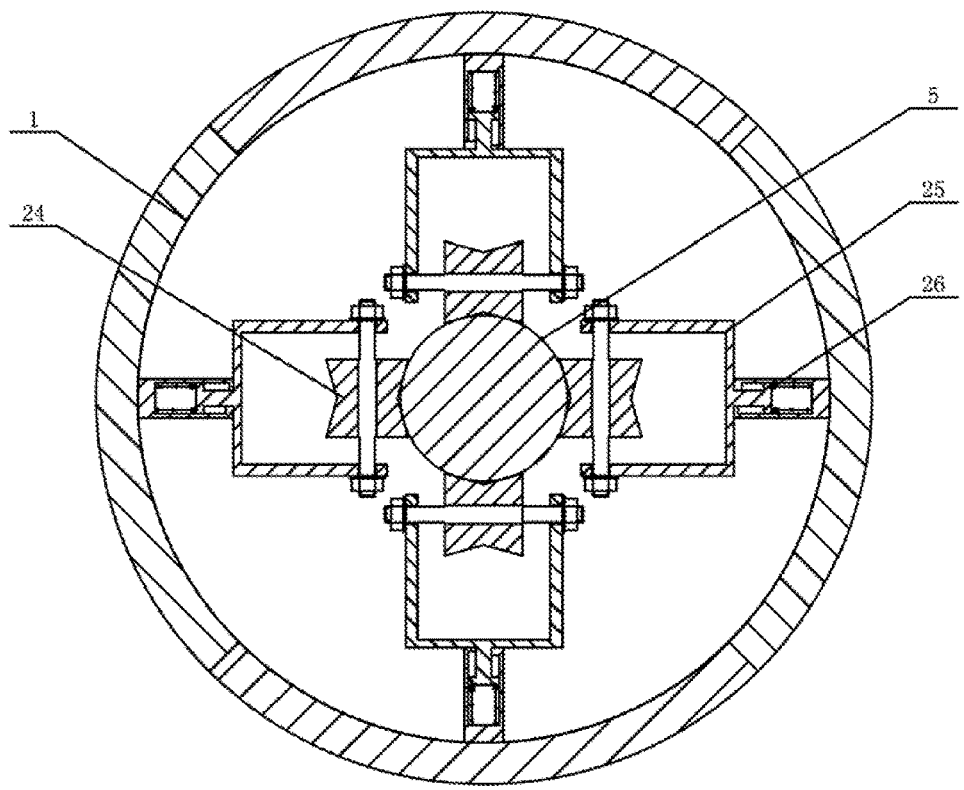
FIG. 3 is a cross-sectional view of a guide mechanism of a rope climbing robot capable of surmounting an obstacle according to the present invention.
Figure 4:
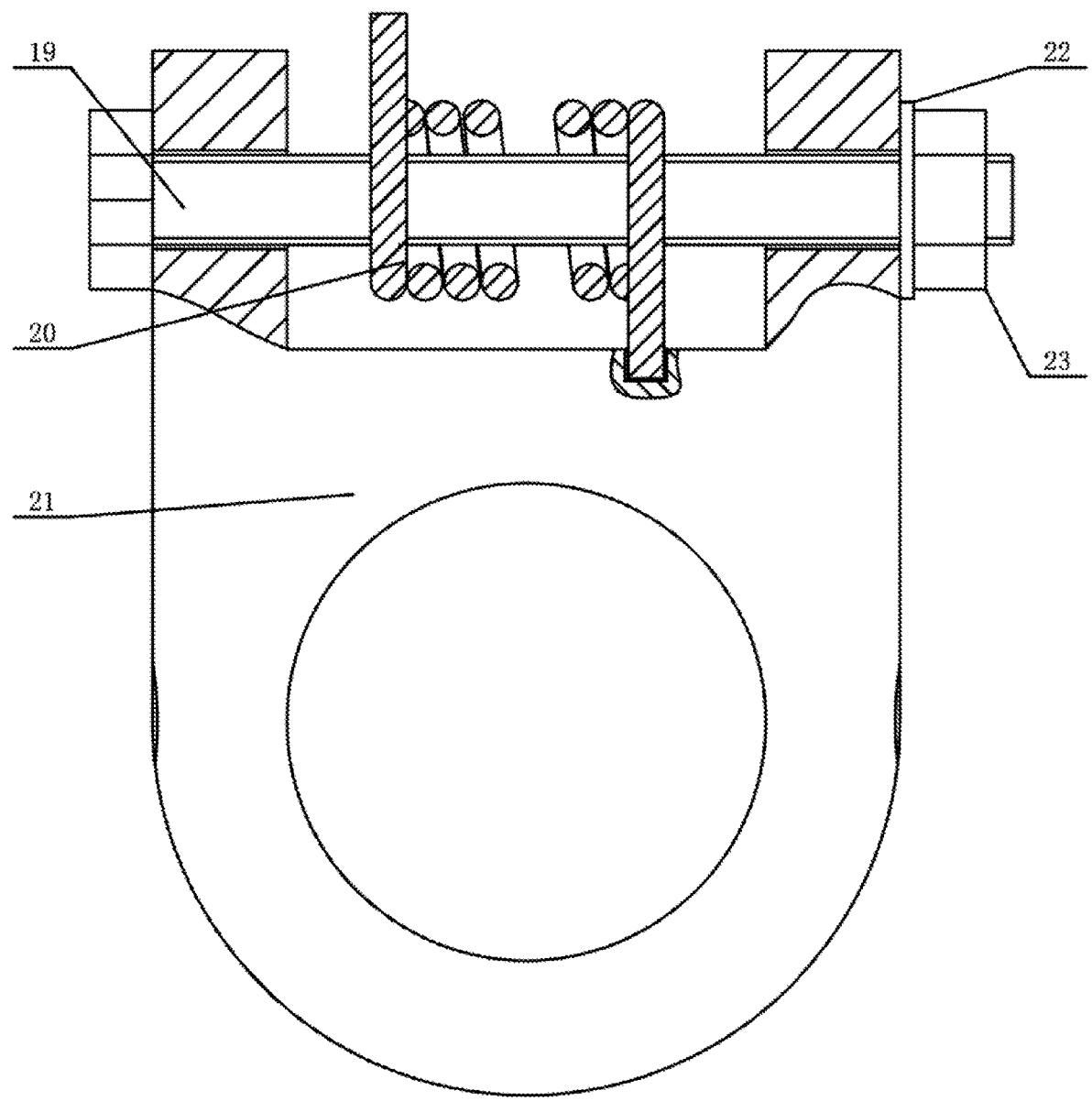
FIG. 4 is a cross-sectional view of a memory alloy mechanism of a rope climbing robot capable of surmounting an obstacle according to the present invention.

The following clearly and completely describes the technical solutions in the embodiments of the present invention with reference to the accompanying drawings in the embodiments of the present invention. Apparently, the described embodiments are merely some but not all of the embodiments of the present invention. The following description of at least one exemplary embodiment is actually only illustrative, and in no way serves as any limitation to the present invention and its application or use. All other embodiments obtained by those of ordinary skill in the art based on the embodiments of the present invention without creative efforts shall fall within the protection scope of the present invention. Unless otherwise specified, the relative arrangement, expressions, and values of the components and steps set forth in these embodiments do not limit the scope of the present invention. In addition, it should be understood that, for ease of description, the dimensions of the parts shown in the accompanying drawings are not drawn to actual scale. The technologies, methods, and devices known to those of ordinary skill in the art may not be discussed in detail, but when appropriate, the technologies, methods, and devices should be regarded as part of the authorized specification. In all the examples shown and discussed herein, any specific value should be interpreted as merely exemplary, and not as a limitation. Therefore, other examples of the exemplary embodiment may have different values.

For ease of description, spatially relative terms, such as "on top of", "above", "on the surface of", and "on", may be used herein to describe a spatial location relationship between one device or feature and another device or feature shown in the figure. It should be understood that the spatially relative terms are intended to encompass different orientations in use or operation other than the orientation of the devices described in the figure. For example, if a device in the figure is inverted, the device described as "above another device or structure" or "on another device or structure" is then positioned as "below another device or structure" or "under another device or structure". Therefore, the exemplary term "above" can include both orientations of "above" and "below". The device may alternatively be positioned in other different manners (rotated by 90 degrees or in other orientations).

As shown in FIG. 1 to FIG. 5, a rope climbing robot capable of overturning according to the present invention includes a robot body. The robot body is capable of climbing along a guide member, and includes a shell, a drive module 11, and a guide module. Middle positions at two ends of the shell are provided with through holes in communication with each other for the guide member to pass through. The drive module 11 and the guide module are separately mounted in the shell along an extending direction of the guide member. The shell is longitudinally cut into an even number of shell segments, and is laterally cut into a corresponding drive housing segment and a corresponding guide housing segment according to mounting positions of the drive module 11 and the guide module in the shell. There is at least one guide module and at least one guide housing segment, and a shell opening mechanism is further mounted in the shell. The shell opening mechanism includes a first shell opening mechanism configured to open/close the guide housing segment and a second shell opening mechanism configured to open/close the drive housing segment. Each shell segment corresponding to each guide housing segment is equipped with one first shell opening mechanism. Cooperation of the first shell opening mechanisms can open/close the shell segment corresponding to the guide housing segment in the shell. Each first shell opening mechanism includes a shell opening mounting platform 21 and a memory alloy torsion spring 20. The memory alloy torsion spring 20 is mounted on the shell opening mounting platform 21. The shell opening mounting platform 21 has a torsion arm at one end fixed to the shell opening mounting platform 21, and a torsion arm at the other end fixed to one of the shell segments corresponding to the guide housing segment. The second shell opening mechanism can open/close two shell segments disposed at 180° corresponding to the drive housing segment in the shell, and includes scissor rods 10 and an adjustment mechanism that synchronously pushes the scissor rods 10 to move in the same direction to realize opening/closing of the scissor rods 10. The adjustment mechanism includes two linear drive mechanisms, and fixed parts of the two linear drive mechanisms are respectively mounted in the shell segments disposed at 180°. Both ends of each of two rods in the scissor rod 10 are connected between the fixed part of one of the two linear drive mechanisms and a power drive end of the other linear drive mechanism. The shell opening mounting platform 21 is fixed to the fixed part of the linear drive mechanism of the second shell opening mechanism.

Further, a number of the guide modules are two, including a first guide module and a second guide module, which are separately disposed on two sides of the drive module along a length extension direction of the guide member. The shell is laterally cut into three segments including a first housing segment, a second housing segment and a third housing segment in sequence. Both the first housing segment and the third housing segment are the guide housing segments, the first guide module is mounted in the first housing segment, and the second guide module is mounted in the third housing segment. The second housing segment is the drive housing segment.

Further, the shell is longitudinally cut into four shell segments including a first shell segment, a second shell segment, a third shell segment and a fourth shell segment.

Further, the linear drive mechanism is a screw mechanism, including a stepper motor, a spiral screw 9 connected to a power output end of the stepper motor, and a screw nut in threaded fitting connection with the spiral screw 9. The spiral screw 9 of each screw mechanism is correspondingly fixed in each shell segment corresponding to the second housing segment along a length extension direction of the shell. The shell opening mounting platform 21 is fixed to the spiral screw 9 by a bolt.

Further, the first shell opening mechanism further includes a double-ended stud 19, a spring washer 22 and a nut 23. The double-ended stud 19 is fixed to the shell opening mounting platform 21 by the nut 23 fitted at both ends. The memory alloy torsion spring 20 is sleeved on a periphery of the double-ended stud 19. The double-ended stud 19 is fitted with the spring washer 22 on an outer side of each of both ends or one end of the memory alloy torsion spring 20.

Further, the drive module 11 is disposed in the shell and includes four small drive modules: a first small drive module, a second small drive module, a third small drive module and a fourth small drive module. The first small drive module, the second small drive module, the third small drive module, and the fourth small drive module are disposed in the shell in two layers. The first small drive module and the third small drive module constitute an upper drive of the drive module 11 and are distributed at 180° on the same ring surface at a splicing position of the first housing segment and the second housing segment. The second small drive module and the fourth small drive module constitute a lower drive of the drive module 11 and are distributed at 180° on the same ring surface at a splicing position of the second housing segment and the third housing segment. Each small drive module includes a drive mechanism platform 16, a direct current brushless motor, a reducer 14, a first-stage bevel gear reducer, a drive shaft 18 and a magnetic wheel 15. The direct current brushless motor 13, the reducer 14, the first-stage bevel gear reducer, and the drive shaft 18 are separately mounted on the drive mechanism platform 16. A power output end of the direct current brushless motor 13 is connected to the magnetic wheel 15 after sequentially passing through the reducer 14, the first-stage bevel gear reducer and the drive shaft 18.

The guide modules each include four small guide modules, and the small guide modules are arranged in a one-to-one correspondence with the four shell segments of the shell. Each small guide module includes a guide mechanism support, a guide mechanism tension spring and a guide wheel. The guide wheel is positioned and supported by the guide mechanism support, and the guide mechanism support is fixed to the shell by the guide mechanism tension spring. The guide mechanism tension spring is made of a memory alloy material. Further, both the first housing segment and the third housing segment are truncated cone-shaped, and the second housing segment is cylindrical. The shell is formed into an olive-like structure with a thick middle part and two tapered ends through sequential splicing of the first housing segment, the second housing segment and the third housing segment.

Another technical objective of the present invention is to provide an obstacle surmounting method based on the rope climbing robot capable of overturning described above.

When the robot body senses presence of a faulty robot ahead, the drive module, the guide module and the shell opening mechanism are controlled to cause the robot body to surmount the faulty robot. The method specifically includes the following steps:

(1) if the robot body senses the presence of the faulty robot ahead, the stepper motor is rotated to release a pre-tightened state;

(2) the direct current brushless motor rotates to drive the magnetic wheel to rotate, where an infrared sensor works to detect whether there is the faulty robot ahead;

(3) after the infrared sensor detects the faulty robot, the direct current brushless motor of the drive module is stopped and the memory alloy torsion spring is heated;

(4) after the heating of the memory alloy torsion spring is completed, the direct current brushless motor and the stepper motor co-rotates to surmount the third housing segment of the faulty robot; and after the third housing segment is surmounted, the stepper motor stops rotating;

(5) when the magnetic wheel reaches the first housing segment of the faulty robot, the stepper motor of the robot body rotates to retract the scissor rods;

(6) after the robot body completely surmounts the faulty robot, the stepper motor stops rotating and the direct current brushless motor continues to rotate; and (7) if it is determined that the robot reaches a specified position, the direct current brushless motor stops rotating, and the stepper motor rotates to pre-tighten the spiral screw.

Embodiment

A specific embodiment of the present invention is to be described in detail below with reference to the accompanying drawings. As shown in FIG. 1 to FIG. 5, a rope climbing robot capable of capable of surmounting an obstacle according to the present invention includes a robot body, where the robot body includes a shell, a shell opening mechanism, a drive module 11 and a guide module. Middle positions at two ends (upper and lower ends shown in FIG. 1) of the shell are provided with through holes in communication with each other for a guide member such as a steel wire rope 5 or a straight rod to pass through, so that the robot body, under a normal working condition, can use the guide member (for example, the steel wire rope 5 the straight rod, or another component) that is usually placed vertically, to climb along the foregoing guide member under the power of the drive module and the auxiliary guidance of the guide module.

To enable the robot body of the present invention to surmount an obstacle during climbing when there is the obstacle on the foregoing guide member (where mainly several robot bodies are arranged in a length direction of the guide member. When a robot body is faulty and cannot climb along the guide member, it becomes an obstacle to other robot bodies crawling behind), in the present invention, the shell is first longitudinally cut into two or more segments. The shell shown in FIG. 1 is uniformly cut into four shell segments including a first shell segment, a second shell segment, a third shell segment and a fourth shell segment. The first shell segment, the second shell segment, the third shell segment, and the fourth shell segment can be enclosed in sequence to form the shell. In this way, the shell opening mechanism can be disposed in the housing to push the segments of the shell from the inside to the outside, so as to open the shell. When surmounting an obstacle, segments of the robot body can be at a periphery of the obstacle, that is, the obstacle is wrapped in the shell of the robot body.

In the present invention, the drive module is disposed in a middle position of an inner cavity of the housing, and there are two guide modules including a first guide module and a second guide module, which are symmetrically disposed at both ends of the drive module. In the figures, the first guide module is located at an upper end of the drive module to form an upper guide device 2, and the second guide module is located at a lower end of the drive module to form a lower guide device 12. A drive wheel of the drive module can climb along the guide member, and a guide wheel of the guide module can also move along the guide member.

Because the robot body climbs along the guide member gradually, during opening of the full-length shell segments, a guide wheel of the first guide module, the drive wheel of the drive module, and a guide wheel of the second guide module are inevitably pulled away from the guide member at the same time. As a result, the drive wheel of the drive module is separated from the guide member before reaching the obstacle, and consequently, cannot be used for driving. Therefore, in the present invention, the housing is laterally cut into three segments including a first housing segment, a second housing segment and a third housing segment. According to a direction shown in FIG. 1, the first housing segment is located at the top, the third housing segment is located at the bottom, and the second housing segment is located between the first housing segment and the third housing segment as a second housing. In this case, the four shell segments of the shell are: a first shell segment (a), a first shell segment (b), a first shell segment (c) and a first shell segment (d) respectively at positions corresponding to the first housing segment; a second shell segment (a), a second shell segment (b), a second shell segment (c), and a second shell segment (d) respectively at positions corresponding to the second housing segment; and a third shell segment (a), a third shell segment (b), a third shell segment (c) and a third shell segment (d) respectively at positions corresponding to the third housing segment. The first shell segment (a), the second shell segment (a) and the third shell segment (a) can be spliced to form the full-length first shell segment. The first shell segment (b), the second shell segment (b), and the third shell segment (b) can be spliced to form the full-length second shell segment. The first shell segment (c), the second shell segment (c) and the third shell segment (c) can be spliced to form the full-length third shell segment. The first shell segment (d), the second shell segment (d) and the third shell segment (d) can be spliced to form the full-length fourth shell segment.

In addition, to help the rope climbing robot to surmount an obstacle (a faulty rope climbing robot ahead), in the present invention, the shell is configured to be in an olive-like shape. Specifically, both the first housing segment and the third housing segment are truncated cone-shaped. A narrow end of the first housing segment is at the top and a wide end of the first housing segment is at the bottom. A wide end of the third housing segment is at the top and a narrow end of the third housing segment is at the bottom. The second housing segment is cylindrical. The narrow end of the first housing segment and the narrow end of the third housing segment are provided with through holes in communication with each other, for the guide member to pass through. Therefore, the shell can be formed into an olive-like structure with a thick middle part and two tapered ends through sequential splicing of the first housing segment, the second housing segment and the third housing segment.

In the present invention, there are two types of shell opening mechanisms: first shell opening mechanism and second shell opening mechanism. There are two first shell opening mechanisms: a first shell opening mechanism (a) and a first shell opening mechanism (b), configured to open the corresponding first housing segment and the corresponding third housing segment, respectively. The first shell opening mechanism (a) is disposed in the shell and corresponding to a splicing position of the first housing segment and the second housing segment, and is configured to open/close the first housing segment. The first shell opening mechanism (b) is disposed in the shell and corresponding to a splicing position of the second housing segment and the third housing segment, and is configured to open/close the third housing segment. The second shell opening mechanism is disposed in the second housing segment and configured to open/close the second housing segment. The second shell opening mechanism includes a screw mechanism and scissor rods. The screw mechanism includes a stepper motor, a spiral screw connected to a power output end of the stepper motor, and a screw nut in threaded fitting connection with the spiral screw.

Each second shell segment is provided with one screw mechanism. Because there are four shell segments (the second shell segment (a), the second shell segment (b), the second shell segment (c) and the second shell segment (d)) in the present invention, there are four screw mechanisms, which are correspondingly a first screw mechanism, a second screw mechanism, a third screw mechanism, and a fourth screw mechanism.

A spiral screw of each screw mechanism is correspondingly fixed in each shell segment corresponding to the second housing segment along a length extension direction of the shell. That is, a spiral screw of the first screw mechanism is correspondingly fixed in the first shell segment corresponding to the second housing segment, a spiral screw of the second screw mechanism is fixed in the second shell segment corresponding to the second housing segment, a spiral screw of the third screw mechanism is correspondingly fixed in the third shell segment corresponding to the second housing segment, and a spiral screw of the fourth screw mechanism is correspondingly fixed in the fourth shell segment corresponding to the second housing segment.

There are two scissor rods, which are a first scissor rod and a second scissor rod. Each scissor rod includes two rods, which are a rod (a) and a rod (b). One end of the rod (a) of the first scissor rod is fixedly connected with a rod end of the spiral screw of the first screw mechanism, and the other end of the rod (a) of the first scissor rod is fixedly connected to a screw nut of the third screw mechanism. One end of the rod (b) of the first scissor rod is fixedly connected to a rod end of the spiral screw of the third screw mechanism, and the other end of the rod (b) of the first scissor rod is fixedly connected to a screw nut of the first screw mechanism. It can be seen that when a stepper motor of the third screw mechanism is started, the rod (a) of the first scissor rod can move along a threaded screw of the third screw mechanism through the screw nut of the third screw mechanism. When a stepper motor of the first screw mechanism is started, the rod (a) of the first scissor rod can move along a threaded screw of the first screw mechanism through the screw nut of the first screw mechanism. Therefore, the first shell segment (the first shell segment fixed to the first screw mechanism) and the third shell segment (fixed to the third screw mechanism) that correspond to the third housing segment can be driven to move toward or away from each other. Similarly, one end of the rod (a) of the second scissor rod is fixedly connected to a rod end of the spiral screw of the second screw mechanism, and the other end of the rod (a) of the second scissor rod is fixedly connected to the screw nut of the fourth screw mechanism. One end of the rod (b) of the second scissor rod is fixedly connected to a rod end of the spiral screw of the fourth screw mechanism, and the other of the rod (b) of the second scissor rod is fixedly connected to the screw nut of the second screw mechanism. It can be seen that when a stepper motor of the fourth screw mechanism is started, the rod (a) of the second scissor rod can move along a threaded screw of the fourth screw mechanism through the screw nut of the fourth screw mechanism. When a stepper motor of the second screw mechanism is started, the rod (a) of the second scissor rod can move along a threaded screw of the second screw mechanism through the screw nut of the second screw mechanism. Therefore, the second shell segment (fixed to the second screw mechanism) and the fourth shell segment (fixed to the fourth screw mechanism) that correspond to the third housing segment can be driven to move toward or away from each other. In summary, the coordinated work of the stepper motors of the four screw mechanisms can synchronously open/close the shell segments at the corresponding positions of the third housing segment.

The first shell opening mechanism is a memory alloy mechanism 3 based on a memory alloy torsion spring, and specifically includes a double-ended stud, the memory alloy torsion spring, a shell opening mounting platform, a spring washer, and a nut. Each shell segment is provided with one first shell opening mechanism (a) and one first shell opening mechanism (b). Because there are four shell segments (the first, second, third and fourth shell segments) in the present invention, there are eight first shell opening mechanisms (including four first shell opening mechanisms (a) and four first shell opening mechanisms (b)). The four first shell opening mechanisms (a) are respectively a first shell opening mechanism (a1), a first shell opening mechanism (a2), a first shell opening mechanism (a3) and a first shell opening mechanism (a4). One end of each of the four first shell opening mechanisms (a) is fixedly connected to the threaded screw of each of the four screw mechanisms in a one-to-one correspondence through a corresponding shell opening mounting platform, and the other end is correspondingly connected, through a memory alloy torsion spring, to each of the four shell segments disposed corresponding to the first housing segment. Specifically, in each first shell opening mechanism (a), the shell opening mounting platform is fixed to the spiral screw by a bolt, the memory alloy torsion spring is sleeved on a periphery of the double-ended stud, and the memory alloy torsion spring has a torsion arm at one end fixed to the shell opening mounting platform, and a torsion arm at the other end fixed to one of the shell segments corresponding to the first housing segment. The double-ended stud is fixed to the shell opening mounting platform by the nut fitted at both ends. In addition, the double-ended stud is fitted with the spring washer on an outer side of each of both ends or one end of the memory alloy torsion spring. The reason for the use of the spiral screw in the present invention is that it has a self-locking feature, so that no motor drive is required during suspension, and no node system fall accident occurs when the motor is faulty and power is off.

The drive module 11 is disposed in the shell and includes four small drive modules. Each small drive module includes a drive mechanism platform 16, a direct current brushless motor 13, a reducer 14, bevel gear set 17, a first-stage bevel gear reducer, a drive shaft 18 and a magnetic wheel 15. The direct current brushless motor 13, the reducer 14, the first-stage bevel gear reducer, and the drive shaft 18 are separately mounted on the drive mechanism platform. A power output end of the direct current brushless motor 13 is connected to the magnetic wheel 15 after sequentially passing through the reducer 14, the first-stage bevel gear reducer and the drive shaft 18. After a power source is output from the direct current brushless motor 13, after speed reduction and torque increase by the reducer 14, power is output to the drive shaft 18 after speed reduction by the first-stage bevel gear reducer to drive the magnetic wheel 15 on the drive shaft 18 to rotate, to drive the robot body to climb along the guide member. Attraction force between the robot and the guide member is provided by the magnetic wheel 15.

The four small drive modules are respectively a first small drive module, a second small drive module, a third small drive module and a fourth small drive module. The first small drive module, the second small drive module, the third small drive module, and the fourth small drive module are disposed in the shell in two layers. The first small drive module and the third small drive module constitute an upper drive of the drive module and are distributed at 180° on the same ring surface at a splicing position of the first housing segment and the second housing segment. The second small drive module and the fourth small drive module constitute a lower drive of the drive module and are distributed at 180° on the same ring surface at a splicing position of the second housing segment and the third housing segment. Specifically, as shown in FIG. 1, the first small drive module and the third small drive module are arranged at an upper end of an inner cavity of the second housing segment, a drive mechanism platform of the first small drive module is fixed to an upper end of the first screw, and a drive mechanism platform of the third small drive module is fixed to an upper end of the third screw. The second small drive module and the fourth small drive module are arranged at a lower end of the inner cavity of the second housing segment, a drive mechanism platform of the second small drive module is fixed to a lower end of the second screw, and a drive mechanism platform of the fourth small drive module is fixed to a lower end of the fourth screw. A lower end of the first screw, a lower end of the third screw, an upper end of the second screw, and an upper end of the fourth screw are each provided with a power supply placement platform 6 for mounting a power supply and a communication-control device placement platform 8 for mounting a controller and a communications device thereof. In addition, the second shell opening mechanism is located between the upper drive and the lower drive. The power supply is an intrinsically safe power supply, which can provide multiple voltages to supply power to a drive structure, a sensor and other electrical components. The communication control device is an integrated circuit board with functions of wireless communication, GPS positioning, PID speed regulation and sensor signal acquisition and processing. The communication control device is not the focus of this solution and is not to be described in detail herein.

The guide module mainly serves as a guide. There are two guide modules, which are the first guide module and the second guide module. The first guide module is arranged in the first housing segment, and the second guide module is arranged in the third housing segment. The first guide module and the second guide module each include four small guide modules, and the small guide modules are arranged corresponding to the four shell segments of the shell, which may be glued or welded, or connected by bolts. Each small guide module includes a guide mechanism support 25, a guide mechanism tension spring 26 and a guide wheel 24. The guide wheel 24 is positioned and supported by the guide mechanism support 25, and the guide mechanism support 25 is fixed to the shell by the guide mechanism tension spring 26. The guide mechanism tension spring 26 provides a tension, so that the guide wheel 24 is not separated from the steel wire rope 5 (guide member). The guide mechanism tension spring is made of a memory alloy material. When no faulty robot is to be climbed over, the guide mechanism tension spring does not work. When a faulty robot needs to be climbed over, the guide mechanism tension spring is energized to make the guide mechanism tension spring work, to open the first housing segment/the second housing segment under the action of torque, and prepare for overturning.

Figure 5:
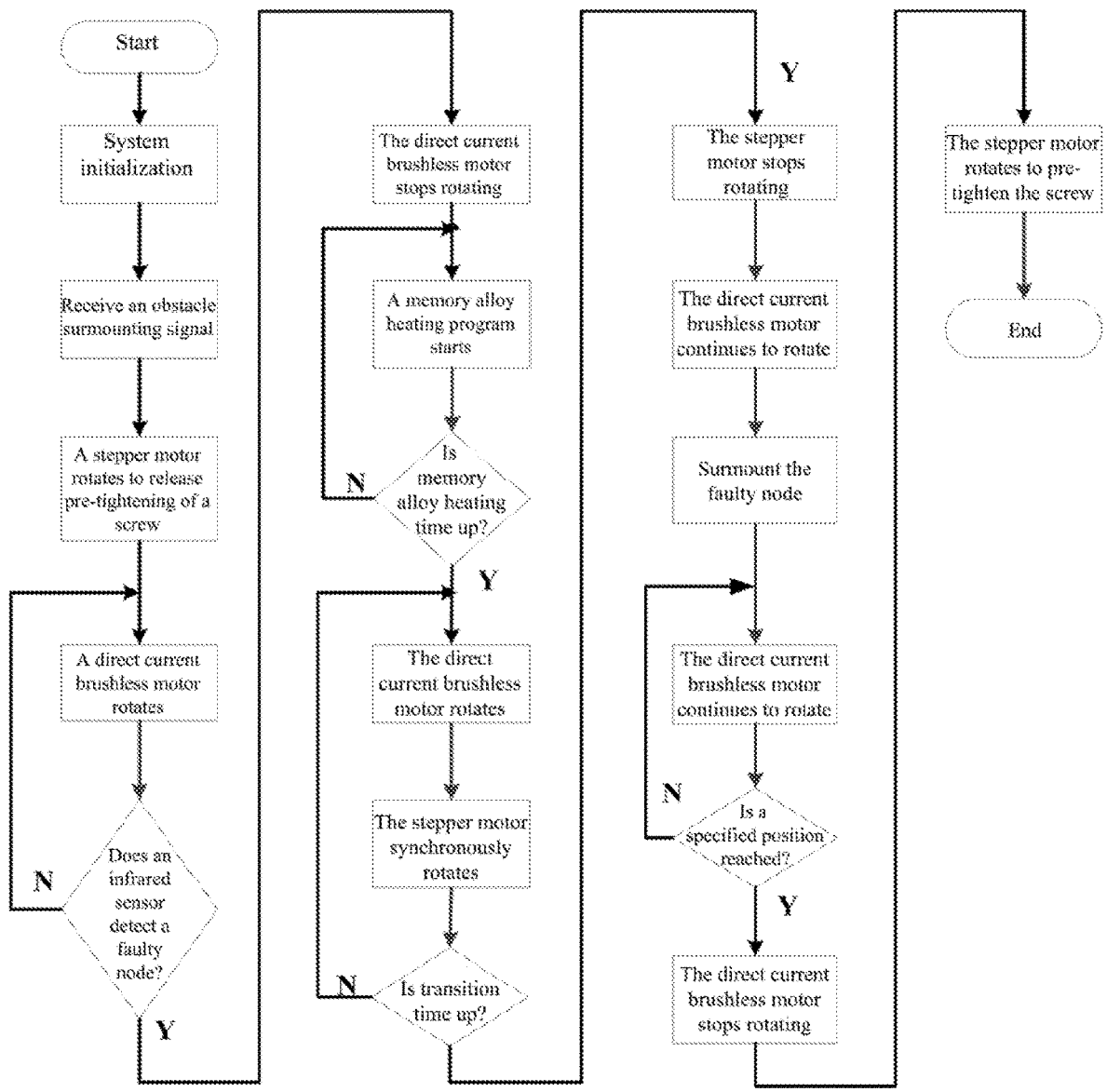
FIG. 5 is a flowchart of controlling a rope climbing robot capable of surmounting an obstacle according to the present invention.

As shown in FIG. 5, the robot works along a steel wire rope 5 arranged in a narrow and deep environment. The robot may have three operating states. In a first state, the robot does not need to move, but suspends on the steel wire rope as a communication node. In a second state, the robot needs to move only between two adjacent robots. In a third state, the robot needs to surmount a faulty robot. In terms of the foregoing three states, there is no doubt that in the first state, movement control of the robot is not required, and may not be considered. In the second state, only driving (climbing) of a direct current brushless motor 13 needs to be considered, this is relatively simple and may be studied in the third state. The third state is the most complicated, and its control is relatively complicated, including control of the direct current brushless motor 13 (climbing), the control of a stepper motor (obstacle surmounting), control of a memory alloy torsion spring 20 (preparation for obstacle surmounting), and control of an infrared sensor (obstacle sensing). Therefore, a software control design is performed only for the third case herein.

The control process may include the following steps.

(1) When a wireless sensor network including a rope climbing robot arranged on a steel wire rope 5 cannot work normally, a system controls the rope climbing robot according to a fault state. A stepper motor is in a pre-tightened state during suspension. When the rope climbing robot receives an obstacle surmounting signal, the stepper motor rotates to release the pre-tightened state.

(2) A direct current brushless motor 13 rotates at this time, to drive a magnetic wheel 15 to rotate, where an infrared sensor works to detect whether there is the faulty robot ahead.

(3) After the infrared sensor detects the faulty robot, the direct current brushless motor 13 stops rotating and a memory alloy torsion spring 20 is heated.

(4) After the heating is completed, the direct current brushless motor 13 and the stepper motor co-rotate to surmount a lower guide mechanism shell 7 of the faulty robot, and the surmounting is completed, the stepper motor stops rotating.

(5) When the magnetic wheel 15 reaches an upper guide mechanism shell 1 (a first shell segment) of the faulty robot, the stepper motor rotates to retract scissor rods 10.

(6) After the faulty robot is completely surmounted, the stepper motor stops rotating and the direct current brushless motor 13 continues to rotate.

(7) If it is determined that the robot reaches a specified position, the direct current brushless motor 13 stops rotating and the stepper motor rotates to pre-tighten a spiral screw 9.

(8) The whole movement process of the rope climbing robot ends.

A method for using the rope climbing robot capable of surmounting an obstacle of the present invention is as follows.

Step one is a mounting phase. First, determine a diameter of an arc outer surface of a magnetic wheel according to a diameter of a steel wire rope, select a sensor that needs to be mounted, fix the sensor and a camera to a loading platform of the robot, and complete a circuit connection as required. Assemble a drive module, an opening mechanism, a guide module, a shell, a power supply module, and a communication module, then mount a middle part of the robot on the steel wire rope according to the foregoing steps, and then separately connect upper and lower parts of the robot to a middle shell module of a middle shell 4 by using the same method.

Step two is a debugging phase. Connect the power supply module, the communication control module, and the drive module to test whether the drive module and the sensor work properly, test normal climbing, suspension, descending, and obstacle surmounting functions of the robot on the steel wire rope, and ensure that the magnetic wheel of the robot does not leave the steel wire rope during operation.

Step three is a formal operation phase. A ground control center sends start and walk commands, and the communication control module receives the commands and controls the robot to climb at a set speed. In addition, the ground control center checks data transmitted by sensors, for example, to detect remaining power of the power supply module, whether the robot works normally, and information such as temperature and humidity inside a wellbore.

The foregoing descriptions are merely the preferred implementations of the present invention. It should be noted that those of ordinary skill in the art may further make several improvements and modifications without departing from the principle of the present invention. These improvements and modifications should also be considered as falling within the protection scope of the present invention.

What is claimed is:

1. A rope climbing robot capable of overturning, comprising a robot body, wherein the robot body is capable of climbing along a guide member, and comprises a shell, a drive module and at least one guide module; middle positions at two ends of the shell are provided with through holes in communication with each other for the guide member to pass therethrough, the drive module and the guide module are separately mounted in the shell along an extending direction of the guide member, the shell is longitudinally cut into an even number of shell segments, and is laterally cut into a corresponding drive housing segment and at least one corresponding guide housing segment according to mounting positions of the drive module and the guide module in the shell, and a shell opening mechanism is further mounted in the shell;

the shell opening mechanism comprises at least one first shell opening mechanism configured to open/close the guide housing segment and at least one second shell opening mechanism configured to open/close the drive housing segment;

each shell segment corresponding to each guide housing segment is equipped with one first shell opening mechanism; cooperation of the first shell opening mechanisms is able to open/close the shell segment corresponding to the guide housing segment in the shell, and each first shell opening mechanism comprises a shell opening mounting platform and a memory alloy torsion spring; and the memory alloy torsion spring is mounted on the shell opening mounting platform, and the shell opening mounting platform has a torsion arm at one end fixed to the shell opening mounting platform, and a torsion arm at the other end fixed to one of the shell segments corresponding to the guide housing segment; and the second shell opening mechanism is able to open/close two shell segments disposed at 180° corresponding to the drive housing segment in the shell, and comprises scissor rods and an adjustment mechanism that synchronously pushes the scissor rods to move in a same direction to realize opening/closing of the scissor rods; the adjustment mechanism comprises two linear drive mechanisms, and fixed parts of the two linear drive mechanisms are respectively mounted in the shell segments disposed at 180°; both ends of each of two rods of the scissor rod are connected between the fixed part of one of the two linear drive mechanisms and a power drive end of the other linear drive mechanism; and the shell opening mounting platform is fixed to the fixed part of the linear drive mechanism of the second shell opening mechanism.

2. The rope climbing robot capable of overturning according to claim 1, wherein a number of the guide modules is two, including a first guide module and a second guide module, which are separately disposed on two sides of the drive module along a length extension direction of the guide member;

the shell is laterally cut into three segments including a first housing segment, a second housing segment and a third housing segment in sequence;

both the first housing segment and the third housing segment are the guide housing segments, the first guide module is mounted in the first housing segment, and the second guide module is mounted in the third housing segment; and the second housing segment is the drive housing segment.

3. The rope climbing robot capable of overturning according to claim 2, wherein the shell is longitudinally cut into four shell segments including a first shell segment, a second shell segment, a third shell segment and a fourth shell segment.

4. The rope climbing robot capable of overturning according to claim 3, wherein the linear drive mechanisms are screw mechanisms, each of which includes a stepper motor, a spiral screw connected to a power output end of the stepper motor, and a screw nut in threaded fitting connection with the spiral screw; the spiral screw of each screw mechanism is correspondingly fixed in each shell segment corresponding to the second housing segment along a length extension direction of the shell; and the shell opening mounting platform is fixed to the spiral screw by a bolt.

5. The rope climbing robot capable of overturning according to claim 3, wherein the first shell opening mechanism further comprises a double-ended stud, a spring washer and a nut;
the double-ended stud is fixed to the shell opening mounting platform by the nut fitted at both ends; and
the memory alloy torsion spring is sleeved on a periphery of the double-ended stud; and the double-ended stud is fitted with the spring washer on an outer side of each of both ends or one end of the memory alloy torsion spring.

6. The rope climbing robot capable of overturning according to claim 3, wherein the drive module is disposed in the shell and comprises four small drive modules including a first small drive module, a second small drive module, a third small drive module, and a fourth small drive module; and the first small drive module, the second small drive module, the third small drive module, and the fourth small drive module are disposed in the shell in two layers; and
the first small drive module and the third small drive module constitute an upper drive of the drive module and are distributed at 180° on a same ring surface at a splicing position of the first housing segment and the second housing segment; and the second small drive module and the fourth small drive module constitute a lower drive of the drive module and are distributed at 180° on a same ring surface at a splicing position of the second housing segment and the third housing segment.

7. The rope climbing robot capable of overturning according to claim 6, wherein each small drive module comprises a drive mechanism platform, a direct current brushless motor, a reducer, a first-stage bevel gear reducer, a drive shaft and a magnetic wheel; the direct current brushless motor, the reducer, the first-stage bevel gear reducer and the drive shaft are separately mounted on the drive mechanism platform, and a power output end of the direct current brushless motor is connected to the magnetic wheel after sequentially passing through the reducer, the first-stage bevel gear reducer and the drive shaft.

8. The rope climbing robot capable of overturning according to claim 6, wherein the guide modules each comprise four small guide modules, and the small guide modules are respectively arranged corresponding to the four shell segments of the shell; each of the small guide modules comprises a guide mechanism support, a guide mechanism tension spring and a guide wheel, the guide wheel is positioned and supported by the guide mechanism support, and the guide mechanism support is fixed to the shell by the guide mechanism tension spring; and the guide mechanism tension spring is made of a memory alloy material.

9. The rope climbing robot capable of overturning according to claim 2, wherein both the first housing segment and the third housing segment are truncated cone-shaped, and the second housing segment is cylindrical; and the shell is formed into an olive-like structure with a thick middle part and two tapered ends through sequential splicing of the first housing segment, the second housing segment and the third housing segment.

10. An obstacle surmounting method based on the rope climbing robot capable of overturning according to claim 1, wherein when the robot body senses presence of a faulty robot ahead, the drive module, the guide module and the shell opening mechanism are controlled to cause the robot body to surmount the faulty robot, and the method comprising the following steps:
step (1): if the robot body senses the presence of the faulty robot ahead, rotating the stepper motor to release a pre-tightened state;
step (2): rotating the direct current brushless motor to drive rotation of the magnetic wheel, wherein an infrared sensor works to detect whether there is the faulty robot ahead;
step (3): after the infrared sensor detects the faulty robot, stopping the direct current brushless motor of the drive module, and heating the memory alloy torsion spring;
step (4): after the heating of the memory alloy torsion spring is completed, co-rotating the direct current brushless motor and the stepper motor to surmount the third housing segment of the faulty robot; and after the third housing segment is surmounted, stopping rotation of the stepper motor;
step (5): when the magnetic wheel reaches the first housing segment of the faulty robot, reversely rotating the stepper motor of the robot body to retract the scissor rods;
step (6): after the robot body completely surmounts the faulty robot, stopping rotation of the stepper motor, and continuously rotating the direct current brushless motor; and
step (7): determining that the robot reaches a specified position, stopping rotation of the direct current brushless motor, and rotating the stepper motor to pre-tighten the spiral screw.

* * * * *